(12) United States Patent
Fahlbusch et al.

(10) Patent No.: US 7,349,162 B2
(45) Date of Patent: Mar. 25, 2008

(54) IMMERSION MICROSCOPE OBJECTIVE

(75) Inventors: Ingo Fahlbusch, Goettingen (DE);
Renhu Shi, Goettingen (DE)

(73) Assignee: Carl Zeiss Jena GmbH, Jena (DE)

( * ) Notice: Subject to any disclaimer, the term of this patent is extended or adjusted under 35 U.S.C. 154(b) by 34 days.

(21) Appl. No.: 11/254,878

(22) Filed: Oct. 19, 2005

(65) Prior Publication Data
US 2006/0087745 A1    Apr. 27, 2006

(30) Foreign Application Priority Data
Oct. 19, 2004 (DE) ............... 10 2004 051 357

(51) Int. Cl.
*G02B 21/02* (2006.01)
*G02B 21/00* (2006.01)

(52) U.S. Cl. .................... 359/658; 359/380

(58) Field of Classification Search ......... 359/379, 359/380, 382, 384, 657, 658
See application file for complete search history.

(56) References Cited

U.S. PATENT DOCUMENTS 4,208,101 A * 6/1980 Trapp et al. ............. 359/656
5,530,590 A * 6/1996 Saito ....................... 359/658

* cited by examiner

*Primary Examiner*—William C Choi
(74) *Attorney, Agent, or Firm*—Reed Smith LLP

(57) ABSTRACT

The invention is directed to an immersion microscope objective. An objective of this kind has an adjusting element, for example, a correction ring, by which it can be adjusted to different immersion media. In an advantageous manner, the objective can also be adjusted to different temperatures of the solutions and different coverslip thicknesses of object vessels by the correction ring.

13 Claims, 5 Drawing Sheets

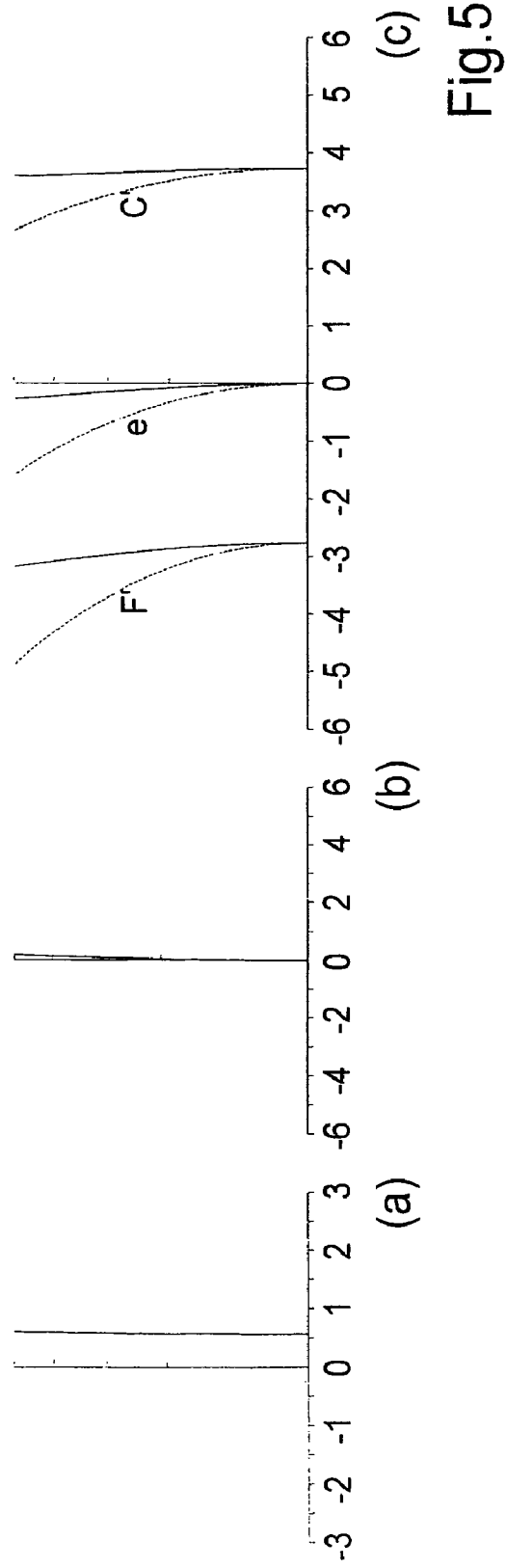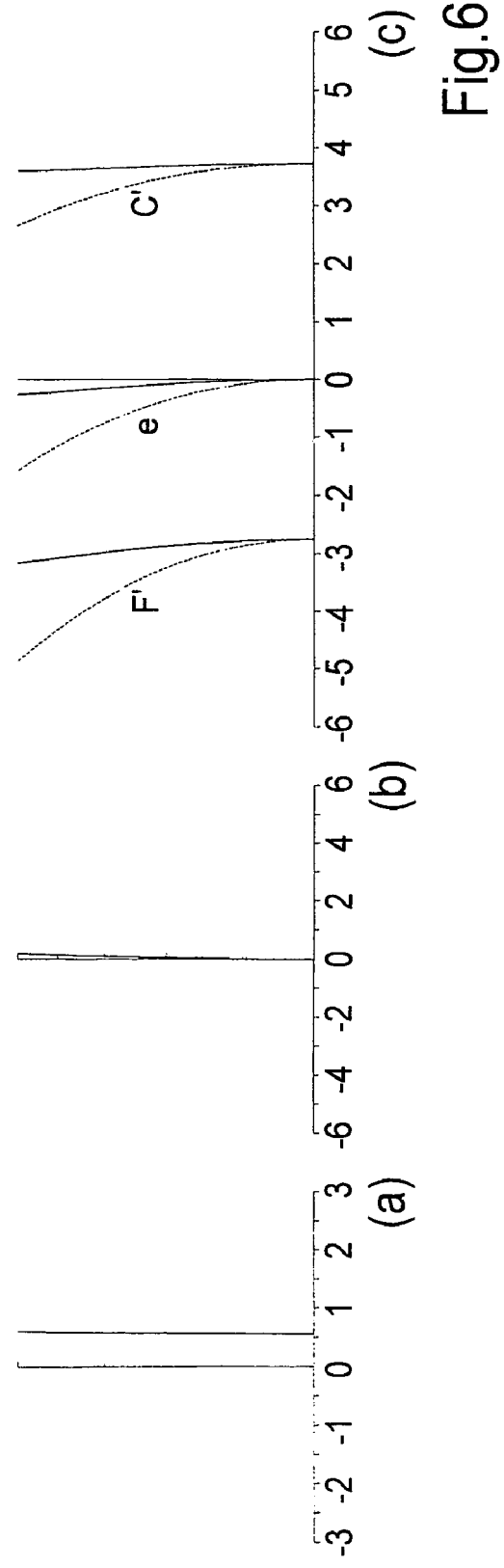

IMMERSION MICROSCOPE OBJECTIVE

CROSS-REFERENCE TO RELATED APPLICATION

This application claims priority of German Application No. 10 2004 051 357.0, filed Oct. 19, 2004, the complete disclosure of which is hereby incorporated by reference.

BACKGROUND OF THE INVENTION a) Field of the Invention

The invention is directed to an immersion microscope objective. Objectives of this kind are used, for example, in laser scanning microscopy (LSM), to observe the three-dimensional structure of biological objects, particularly tissue cultures and cell cultures. The cells are in a vessel with a solution. The vessel is closed by a thin coverslip. The side of the microscope objective facing the object is located on the other side of the vessel in an immersion liquid—at least the lens surface defining the objective on this side must be in the solution. In this connection, it is required that the refractive indices of the liquids on both sides of the coverslip are similar because only then can the layers of the specimen be imaged sharply at different depths. Since the living biological objects are generally in an aqueous solution, primarily water or glycerin are used as immersion liquids. Further, in order to be able to resolve the fine structure of the objects, immersion microscope objectives of the kind mentioned above need a high numerical aperture.

b) Description of the Related Art

Various immersion microscope objectives are known from the prior art. For example, U.S. Pat. No. 5,530,590 provides a microscope objective with three different variants, each with a numerical aperture of 1.15. This objective comprises three groups of lenses, the second lens group being displaceable relative to the two other groups along the optical axis in order to adapt the objective to the thickness of the coverslip for closing the sample, i.e., to compensate the spherical and chromatic aberrations which occur in objectives of this type having a high numerical aperture and which vary with this thickness.

OBJECT AND SUMMARY OF THE INVENTION

It is the primary object of the invention to develop an immersion microscope objective which can be used for different immersion media. Moreover, the image contrast is improved over the prior art and the quality of the image contrast is consistently high as far as possible in different immersion media and within given coverslip thickness ranges and temperature ranges.

This object is met in an immersion microscope objective by providing solution adjusting means by which the objective can be adjusted to different immersion media.

Accordingly, the same objective can be adjusted to different solutions by means of the solution adjusting means—generally by varying the distances of the individual lenses or lens groups relative to one another. This ensures a uniform quality of the image contrast even with different solutions.

Further, in an advantageous development of the invention, temperature adjusting means are provided by which the objective can be adjusted and adapted to different temperatures of the respective immersion medium.

Further, in another development of the invention, coverslip adjusting means are provided by which the objective can be adjusted to different thicknesses of a coverslip which closes an object vessel.

In a preferred construction which makes it possible to adapt to different requirements in a simple manner and by which a uniformly good image contrast can be achieved, the immersion microscope objective comprises twelve lenses, some of which are combined in cemented lens groups. In order from the object plane along the optical axis, the objective comprises, first, a first lens group with a positive focal length comprising a first lens with a positive focal length and a second lens with a negative focal length, which two lenses are cemented together. Following at a distance $A_1$ from the first lens group between the lens surfaces along the optical axis is a meniscus-shaped third lens with lens surfaces whose centers of curvature lie on the object side and which has a positive focal length. Following the latter at a distance $A_2$ from the third lens is a second lens group with a positive focal length comprising a fourth lens with a positive focal length, a fifth lens with a negative focal length, and a sixth lens with a positive focal length. The fourth lens is cemented to the fifth lens and the latter is cemented to the sixth lens. Following at a distance $A_3$ from the second lens group is a third lens group with a negative focal length comprising a seventh lens with a negative focal length, an eighth lens with a positive focal length, and a ninth lens with a negative focal length. The seventh lens is cemented to the eighth lens and the latter is cemented to the ninth lens. This is followed next at a distance $A_4$ from the third lens group by a meniscus-shaped tenth lens with lens surfaces whose centers of curvature lie on the image side and which has a positive focal length. Finally, following the latter at a distance $A_5$ from the tenth lens is a fourth lens group with a negative focal length comprising a meniscus-shaped eleventh lens with a positive focal length and a biconcave twelfth lens which are cemented together. Following at a distance $A_6$ is a back shutter which closes the objective. The distances $A_1, \ldots, A_6$ can be varied so that it is possible to adjust to the requirements of different solutions, solution temperatures and coverslip thicknesses.

The first lens and the twelfth lens are preferably made of the same material with a refractive index $n_e < 1.50$ and an Abbe number $v_e > 70$ at a wavelength of $\lambda_e = 546.07$ nm. The second lens is advantageously meniscus-shaped, and the centers of curvature of both lens surfaces lie on the object side. The first lens is inserted in the object-side concave curve of the second lens as a filling lens; the lens surface situated on the object side is preferably plane. This makes it possible to move very close to the coverslip so that only a thin film of immersion liquid is between the coverslip and the lens surface.

In order to adapt to different coverslip thicknesses, immersion media and temperatures and to compensate for various imaging errors that occur, the distances between the individual lenses or lens groups, $A_1$ to $A_6$, can be varied along the optical axis. However, since the variation of each individual distance contains many degrees of freedom independent from the others and an optical adjustment can be achieved, as a rule, only after much experimentation, a correction ring serving as solution adjusting means is provided at the objective barrel in a particularly preferred embodiment for varying and adapting the distances $A_1$ to $A_6$. The correction ring and the barrel are advantageously provided with solution marks which allow quick adjustment to the respective immersion media.

In another preferred construction, the correction ring also has the function of temperature adjusting means. For this purpose, the correction ring or the barrel is preferably provided with temperature marks; alternatively, both the correction ring and the barrel can also be provided with marks of this kind.

In another preferred construction, the correction ring also has the function of coverslip adjusting means. For this purpose, the correction ring or the barrel is preferably provided with coverslip thickness marks; alternatively, both the correction ring and the barrel can also be provided with marks of this kind It is assumed by way of approximation first that the distances $A_1$ to $A_6$ are in a linear relationship and, further, that each of the distances is in a linear relationship with the temperature, the type of immersion medium, or the coverslip thickness. This approximation is valid for small variations in the coverslip thickness, the composition of the immersion media and slight changes in temperature.

For example, given two immersion media, water—designated by W—and glycerin—designated by G—the following equations apply for temperatures between $T_0=23°$ C. and $T_{max}=37°$ C. and for three coverslip thicknesses, taken by way of example, of $D_0=0.15$ mm, $D_1=0.17$ mm and $D_2=0.19$ mm:

with variations in the coverslip thicknesses $$\frac{A_{i,G/W,D_2,T} - A_{i,G/W,D_1,T}}{A_{i,G,D_1,T_0} - A_{i,W,D_1,T_0}} = \frac{A_{i,G/W,D_1,T} - A_{i,G/W,D_0,T}}{A_{i,G,D_1,T_0} - A_{i,W,D_1,T_0}} \quad (1)$$

between different air separations $$\frac{A_{i,G/W,D_2,T} - A_{i,G/W,D_1,T}}{A_{i,G,D_1,T_0} - A_{i,W,D_1,T_0}} = \frac{A_{j,G/W,D_2,T} - A_{j,G/W,D_1,T}}{A_{j,G,D_1,T_0} - A_{j,W,D_1,T_0}} \quad (2)$$

and with a change in temperature $$\frac{A_{i,G/W,D_1,T} - A_{i,G/W,D_1,T_0}}{A_{i,G,D_1,T_0} - A_{i,W,D_1,T_0}} = \frac{A_{j,G/W,D_1,T} - A_{j,G/W,D_1,T_0}}{A_{j,G,D_1,T_0} - A_{j,W,D_1,T_0}}, \quad (3)$$

where i and j are natural numbers between 1 and 6 and G/W designates either water or glycerin, so that the distances in the numerators refer in each instance to one of the two solutions. T designates any temperature between $T_0$ and $T_{max}$. Of course, other coverslip thicknesses D can also be selected. In this way, the air separations between the individual lenses or lens groups can be changed to the various conditions with different immersion media, etc. and imaging errors such as spherical aberration and longitudinal chromatic aberrations in particular, but also coma, astigmatism, distortion and field curvature, can be corrected. Because of the linearity, the construction of the objective and its operation can be simplified considerably.

In this regard, the objective can be constructed in such a way that the distance between the object plane and the object-side surface of the tenth lens along the optical axis—with the thickness of the coverslip remaining the same—remains constant independent from the adjustment to the immersion medium that is used. Therefore, the tenth lens forms a fixed point in the objective.

An advantageous construction of the immersion microscope objective is given with the constructional data indicated in subclaim 14. The refractive indices refer to a wavelength of 546.07 nm. The Abbe numbers $v_e$ were calculated from the following equation:

$$v_e = \frac{n_e - 1}{n_{F'} - n_{C'}},$$

where $n_e$ is the refractive index at a wavelength of $\lambda_e=546.07$ nm, $n_{C'}$ is the refractive index at a wavelength of $\lambda_{C'}=643.85$ nm, and $n_{F'}$ is the refractive index at a wavelength of $\lambda_{F'}=479.99$ nm. At a distance $A_6$, the objective is first closed by a back shutter. The lens of a tube system with a focal length of 164.50 mm is located at a distance of 126.50 mm from this back shutter.

The objective, according to the invention, is suitable for different immersion media, particularly water and glycerin. When water is used the numerical aperture is 1.2, when glycerin is used the numerical aperture is 1.3. The imaging scale is at a magnification of approximately 63×, the field diameter is 20. The errors are best corrected for solution temperatures in the range from 23° C. to 37° C. and coverslip thicknesses between 0.15 mm and 0.19 mm.

The invention will be described more fully in the following with reference to an embodiment example.

BRIEF DESCRIPTION OF THE DRAWINGS

In the drawings:

FIG. 5 shows field-dependent imaging errors for the adjustment of the objective according to FIG. 1;

FIG. 6 shows field-dependent imaging errors for the adjustment of the objective according to FIG. 2.

DESCRIPTION OF THE PREFERRED EMBODIMENTS

Figure 1:
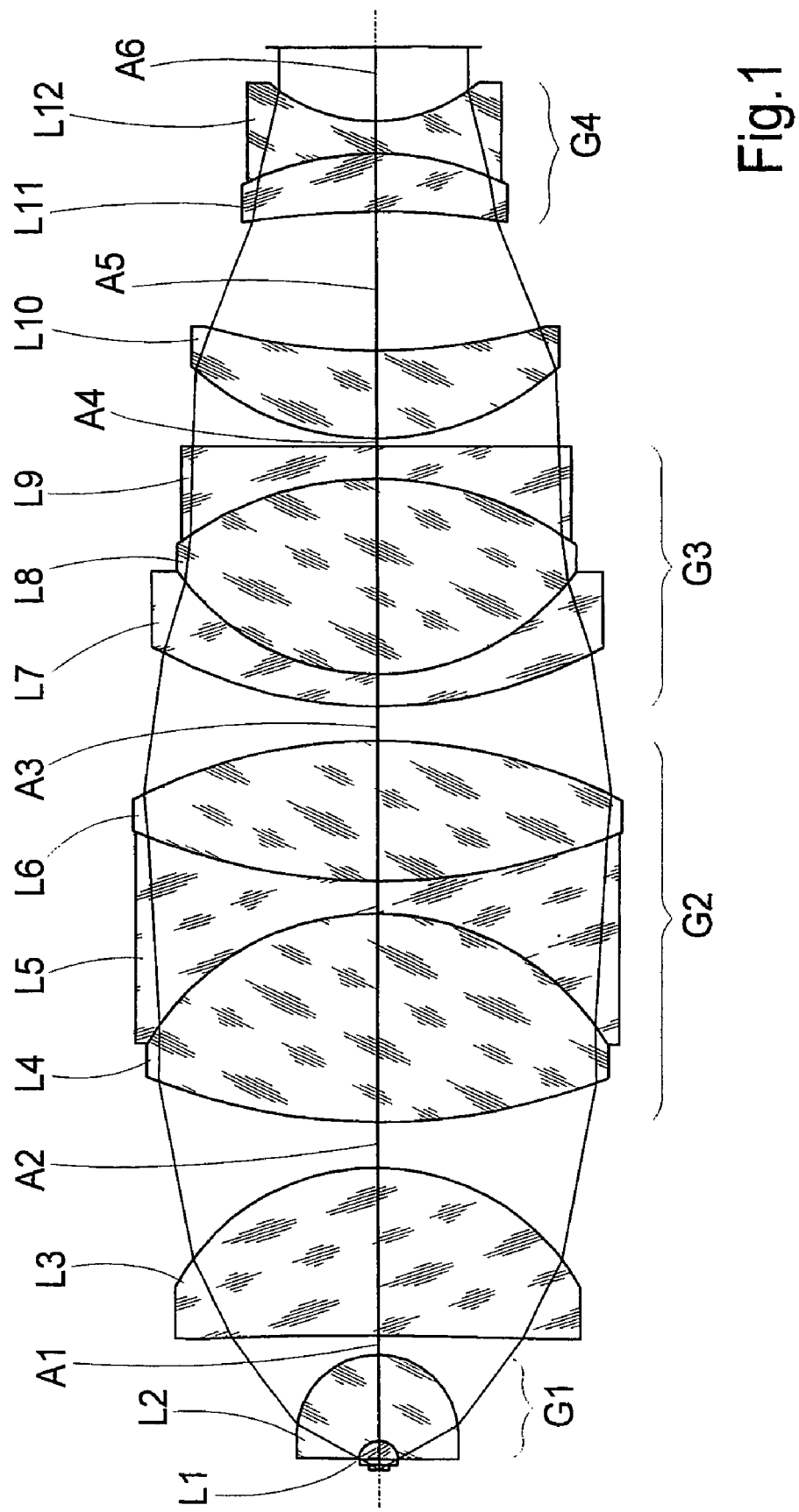
FIG. 1 shows a possible construction of an objective based on the constructional data in subclaim 7 for water as immersion medium.
Figure 2:
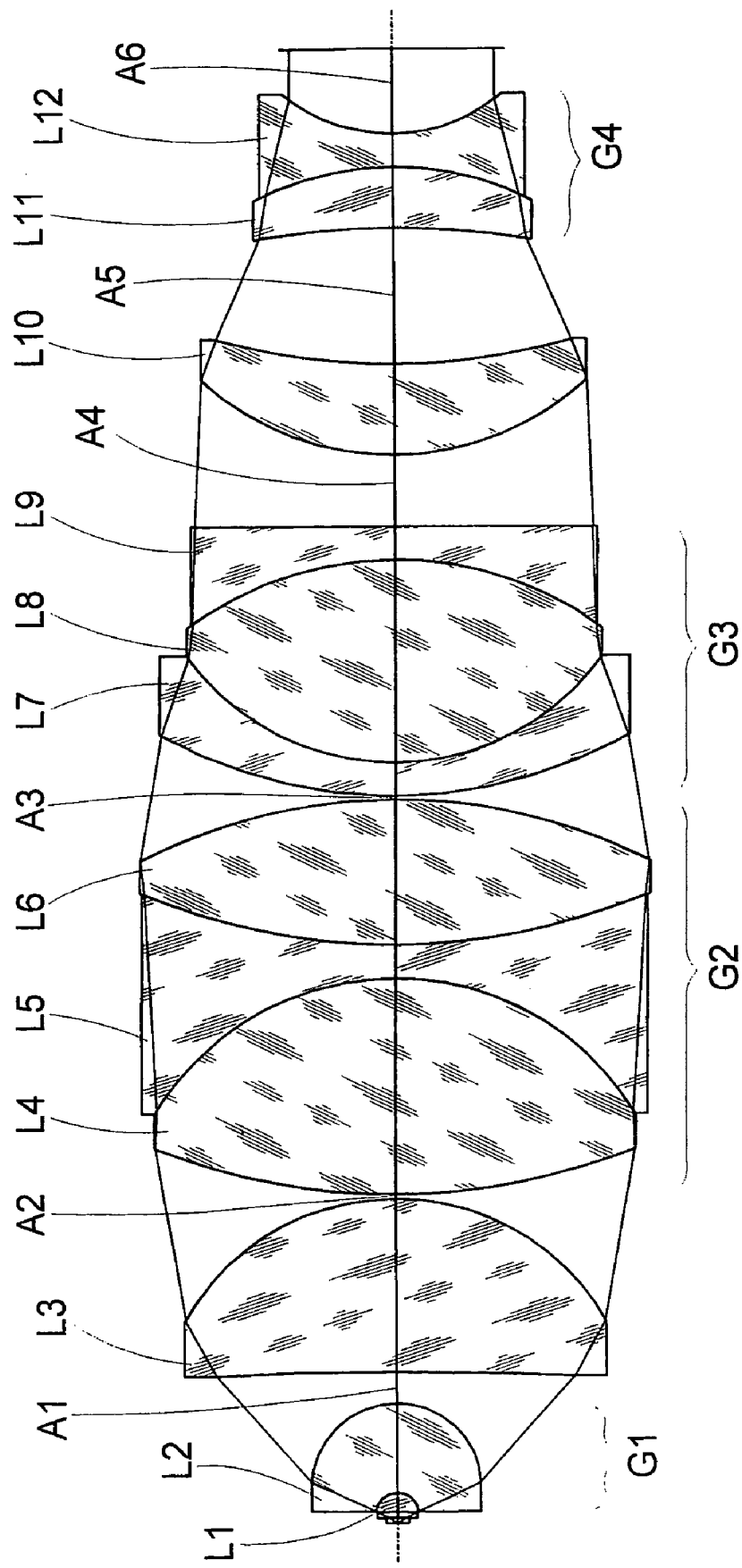
FIG. 2 shows an adjustment of the objective differing from FIG. 1 for glycerin as immersion medium.

FIG. 1 and FIG. 2 show possible constructions of the objective according to the constructional data in subclaim 7 which differ only with respect to the distances between the individual lenses or lens groups. The first lens group G1 which has a positive focal length is arranged at far left on the optical axis. It comprises a first lens L1 with a positive focal length and a second lens L2 with a negative focal length. The two lenses are cemented together. Following the first lens group G1 at a distance $A_1$ from the latter is a third lens L3 with a positive focal length and lens surfaces whose centers of curvature lie on the object side. A second lens group G2 with a positive focal length follows at a distance $A_2$ from the first lens group G1. The second lens group comprises a fourth, fifth and sixth lens L4, L5 and L6, respectively, having a positive focal length, a negative focal length and a positive focal length, respectively. The fourth lens L4 is cemented to the fifth lens L5, and the fifth lens L5 is cemented to the sixth lens L6. Following at a distance $A_3$ from the second lens group G2 is a third lens group G3 with a negative focal length. It comprises a seventh lens L7 with a negative focal length, an eighth lens L8 with a positive focal length, and a ninth lens L9 with a negative focal length. The seventh lens L7 is cemented to the eighth lens L8, and the latter is cemented to the ninth lens L9. Following at a distance $A_4$ from the third lens group G3 is a meniscus-shaped tenth lens L10 with a positive focal length and lens surfaces whose centers of curvature lie on the image side. At a distance $A_5$ from this lens, there follows a fourth lens group G4 with a negative focal length comprising a meniscus-shaped eleventh lens L11 with a positive focal length and a biconcave twelfth lens L12 which are cemented together. The centers of curvature of the lens surfaces of the eleventh lens L11 lie on the object side. Finally, following at a distance $A_6$ from the fourth lens group G4 is a back shutter which closes the objective and which is followed at a distance of 126.50 mm by the lens of a tube system—not shown in this drawing—with a focal length of 164.50 mm.

The two configurations shown in FIGS. 1 and 2 differ from one another only in the selected distances $A_1$ to $A_6$ which are determined depending upon coverslip thickness and immersion medium in accordance with the above equations (1) and (2).

When water is used as immersion medium, the following configurations are obtained, by way of example, at a temperature of 23° C.:

| Coverslip thickness | 0.15 | 0.17 | 0.19 |
|---|---|---|---|
| Working distance | 0.215 | 0.197 | 0.178 |
| $A_1$ | 0.624 | 0.659 | 0.693 |
| $A_2$ | 1.687 | 1.553 | 1.419 |
| $A_3$ | 1.267 | 1.167 | 1.067 |
| $A_4$ | 0.071 | 0.270 | 0.470 |
| $A_5$ | 4.796 | 4.770 | 4.745 |
| $A_6$ | 2.504 | 2.529 | 2.555 |

All of the specified data are given in millimeters. FIG. 1 shows a configuration in which these distances are substantially realized. The working distance refers to the optical working distance between the coverslip and the vertex of the first lens surface.

When glycerin is used as immersion medium, the following configurations are obtained, by way of example, at a temperature of 23° C.:

| Coverslip thickness | 0.15 | 0.17 | 0.19 |
|---|---|---|---|
| Working distance | 0.214 | 0.195 | 0.176 |
| $A_1$ | 1.015 | 1.023 | 1.030 |
| $A_2$ | 0.175 | 0.147 | 0.118 |
| $A_3$ | 0.136 | 0.115 | 0.094 |
| $A_4$ | 2.325 | 2.367 | 2.408 |
| $A_5$ | 4.510 | 4.504 | 4.499 |
| $A_6$ | 2.790 | 2.796 | 2.801 |

All of the specified data are given in millimeters. A configuration in which these distances are substantially realized is shown in FIG. 2.

Accordingly, the objective is suitable for different immersion media, in particular water and glycerin. When water is used, the numerical aperture is 1.2 and when glycerin is used the numerical aperture is 1.3. The imaging scale is −62.4 when water is used as immersion medium and −63.8 when glycerin is used as immersion medium. The field number in both cases is 20. The objective has very good transmission in the visible spectral region and an internal transmission of more than 72% at a wavelength of 365 nm, which is important particularly in applications in fluorescence microscopy.

FIGS. 3 to 6 show different imaging errors of the objective using water and glycerin, respectively, as immersion medium.

Figure 4:
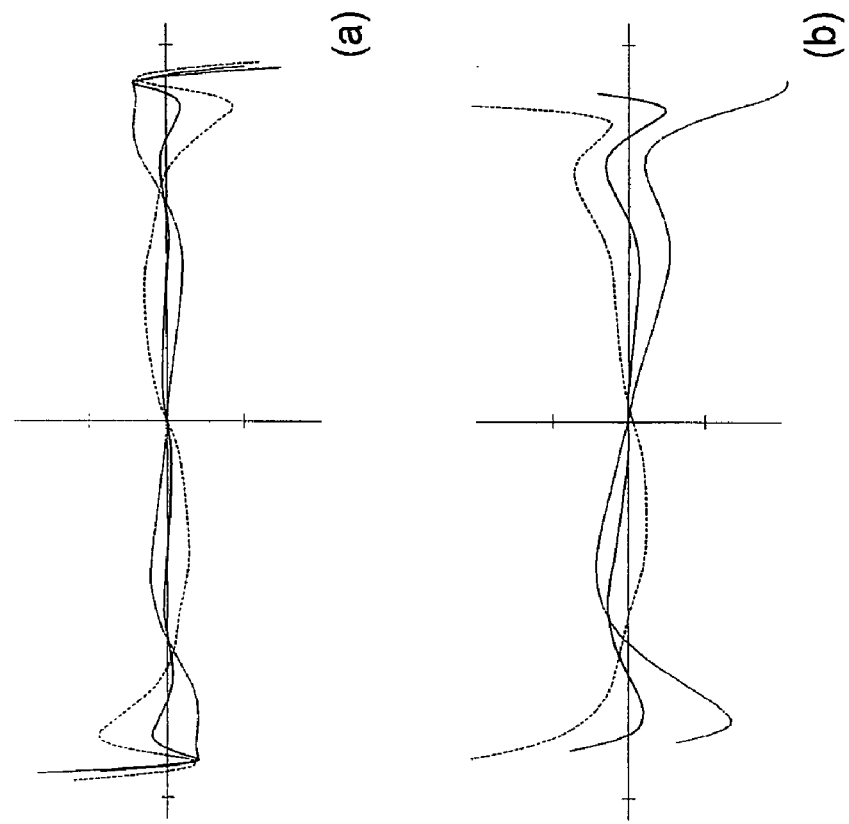
FIG. 4 shows transverse aberrations for the adjustment of the objective according to FIG. 2 in two different image heights.
Figure 3:
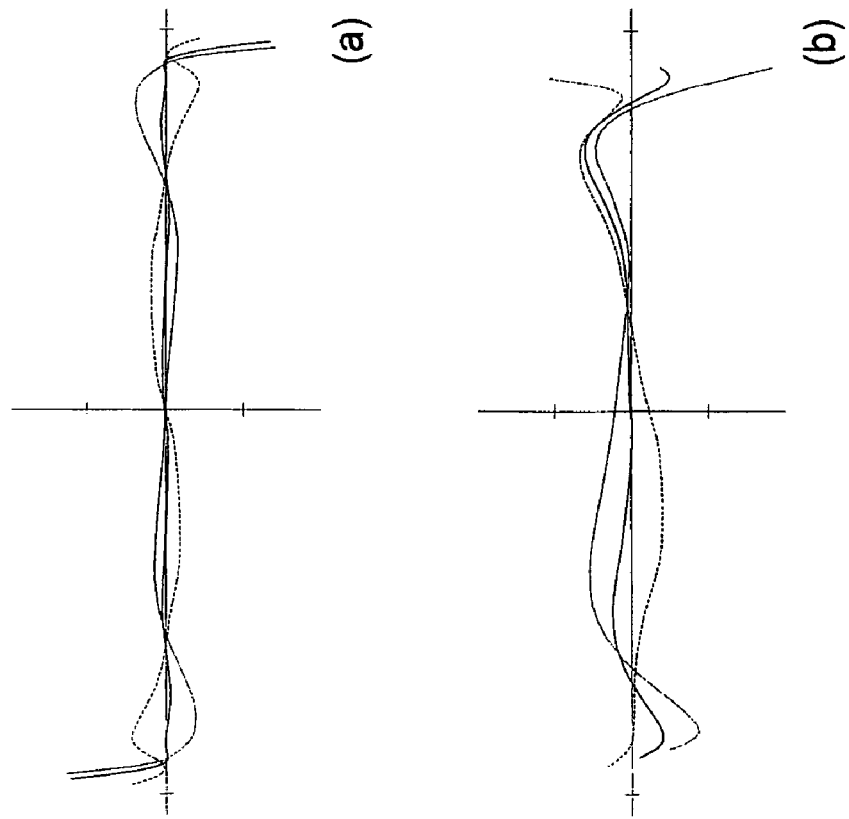
FIG. 3 shows transverse aberrations for the adjustment of the objective according to FIG. 1 in two different image heights.

FIG. 3 shows an image error, namely the transverse aberration as a function of aperture, for the objective when water is used as immersion medium, specifically in the tangential section at two points in the image field, i.e., at the image center (a) and image edge (b). A scale division on the ordinate axis corresponds to 0.08 mm. The transverse aberrations are shown for three different wavelengths: the aberrations at $\lambda_e$=546.07 nm are shown by a solid line, the aberrations at $\lambda_{C'}$=643.85 nm are shown by a dashed line, and the aberrations at $\lambda_{F'}$=479.99 nm are shown by a dotted line. FIG. 4 shows the corresponding transverse aberrations of the objective when glycerin is used as immersion medium.

FIG. 5 shows other image errors of the objective according to the invention when water is used as immersion medium. The image height is shown in millimeters in the vertical axis. The scale divisions on the ordinate correspond, respectively, to $\sqrt{(1/4)}$, $\sqrt{(2/4)}$, $\sqrt{(3/4)}$ and $\sqrt{(4/4)}$ of the maximum field height of 10 mm. FIG. 5(a) shows the chromatic difference of magnification in per mil scaled to the respective image height. FIG. 5(b) shows the distortion of the microscope objective in percent. Finally, FIG. 5(c) shows the astigmatism of the objective in Rayleigh units (R.E.), specifically for the three wavelengths $\lambda e$, $\lambda_{C'}$ and $\lambda_{F'}$ mentioned above. The solid line indicates the sagittal astigmatism and the dashed line shows the tangential astigmatism. FIG. 6 shows the corresponding errors when glycerin is used as immersion medium.

These imaging errors and other errors such as spherical aberration, coma and image field curvature are corrected at $\lambda_e$ and corrected to the greatest extent at $\lambda_{C'}$ and $\lambda_{F'}$. Also, the longitudinal chromatic aberrations of the secondary spectrum—the deviation of the focus positions at $\lambda_{C'}$ and $\lambda_{F'}$ with reference to $\lambda_e$—were minimized to the extent that the difference in the focus positions between $\lambda_e$ and $\lambda_{C'}$ lies within the area of the depth of focus—$\lambda/NA^2$, where NA is the numerical aperture. Since the focus positions coincide at wavelengths $\lambda_{C'}$ and $\lambda_{F'}$ and the image field is flattened, this is a semi-Apochromat Plan Neofluar objective.

Figure 7:
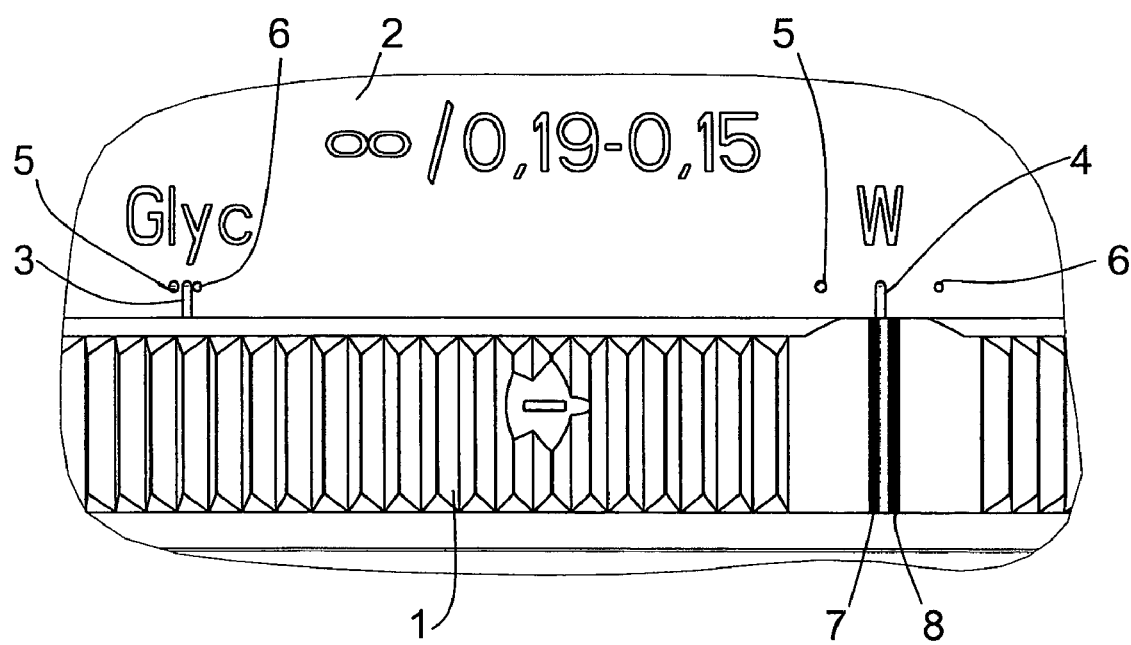
FIG. 7 shows an example for a correction ring for adjusting to different conditions.

Finally, FIG. 7 shows a correction ring 1 which runs around the barrel 2 of the objective and can be rotated around the latter relative to the barrel 2 so that, by rotating, it is possible to switch between the two immersion media, water and glycerin. In addition, two solution marks 3, 4 are arranged on the barrel 2. Solution mark 3 designates the adjustment to glycerin immersion medium which is illustrated by the lettering "Glyc" above this mark. Solution mark 4 designates the adjustment to the water immersion medium, which is illustrated by the letter "W" on the barrel 2 above this mark. The solution marks 3, 4 relate to a coverslip thickness of 0.17 mm. Coverslip thickness marks 5, 6 are provided to the left and right of the solution marks 3, 4. The coverslip thickness marks 5 designate the adjustment to a coverslip thickness of 0.19 mm for the selected immersion medium. Coverslip thickness marks 6 designate the adjustment to a coverslip thickness of 0.15 mm for the selected immersion medium. In the present example, this is the limiting case for which the objective satisfies the required conditions such as good image contrast and validity of the linear approximation described above, and the usable coverslip thickness range is illustrated once again by the lettering "0.19-0.15". Of course, it is possible to adjust to other, intermediate coverslip thicknesses by visual interpolation. It is also possible to arrange additional marks, also for other solutions.

Two temperature marks 7, 8 are arranged on the ring to mark the limits of the temperature range for which the objective meets the required conditions. In this case also, intermediate adjustments are possible. Temperature mark 7 designates a temperature of 37° C., temperature mark 8 designates a temperature of 23° C. To facilitate operation, temperature mark 7 and temperature mark 8 can advantageously be maintained mnemonically in red and blue, respectively. By rotating the correction ring, the objective can be adapted to the conditions under which the microscope examination is to be carried out.

While the foregoing description and drawings represent the present invention, it will be obvious to those skilled in the art that various changes may be made therein without departing from the true spirit and scope of the present invention.

REFERENCE NUMBERS $A_1, \ldots, A_6$ distances between the lenses and lens groups
$G1, \ldots, G4$ lens groups
$L1, \ldots, L12$ lenses
1 correction ring
2 barrel
3, 4 solution mark
5, 6 coverslip thickness mark
7, 8 temperature mark

What is claimed is:

1. An immersion microscope objective, comprising solution adjusting means being provided by which the objective can be adjusted to different immersion media, wherein temperature adjusting means are provided by which the objective can be adjusted to different temperatures of the respective immersion media.

2. The immersion microscope objective according to claim 1, wherein coverslip adjusting means are provided by which the objective can be adjusted to different thicknesses of a coverslip closing an object vessel.

3. An immersion microscope objective, comprising:
solution adjusting means by which the objective can be adjusted to different immersion media;
temperature adjusting means by which the objective can be adjusted to different temperatures of the respective immersion media; and
in order from the object plane along the optical axis:
a first lens group (G1) with a positive focal length further comprising a first lens (L1) with a positive focal length and a second lens (L2) with a negative focal length, wherein the first lens (L1) and the second lens (L2) are cemented together; and,
at a distance ($A_1$) from the first lens group (G1), a meniscus-shaped third lens (L3) with lens surfaces whose centers of curvature lie on the object side and which has a positive focal length; and,
at a distance ($A_2$) from the third lens (L3), a second lens group (G2) with a positive focal length further comprising a fourth lens (L4) with a positive focal length, a fifth lens (L5) with a negative focal length, and a sixth lens (L6) with a positive focal length, wherein the fourth lens (L4) is cemented to the fifth lens (L5) and the latter is cemented to the sixth lens (L6); and,
at a distance ($A_3$) from the second lens group (G2), a third lens group (G3) with a negative focal length further comprising a seventh lens (L7) with a negative focal length, an eighth lens (L8) with a positive focal length, and a ninth lens (L9) with a negative focal length, wherein the seventh lens (L7) is cemented to the eighth lens (L8) and the latter is cemented to the ninth lens (L9); and,
at a distance ($A_4$) from the third lens group (G3), a meniscus-shaped tenth lens (L10) with lens surfaces whose centers of curvature lie on the image side and which has a positive focal length; and,
at a distance ($A_5$) from the tenth lens (L10), a fourth lens group (G4) with a negative focal length further comprising a meniscus-shaped eleventh lens (L11) with lens surfaces whose centers of curvature lie on the object side and with a positive focal length and a biconcave twelfth lens (L12), which lenses are cemented together, wherein the distances ($A_1$), . . . , ($A_5$) and a distance ($A_6$) to a back shutter can be varied.

4. The immersion microscope objective according to claim 3, wherein the first lens (L1) and the twelfth lens (L12) are made of the same material which has a refractive index $n_e < 1.50$ and an Abbe number $V_e > 70$.

5. The immersion microscope objective according to claim 3, wherein the second lens (L2) is meniscus-shaped, the centers of curvature of its lens surfaces lie on the object side, and the first lens (L1) is inserted into the concave curve of the second lens (L2).

6. The immersion microscope objective according to claim 5, wherein the correction ring is provided as coverslip adjusting means.

7. The immersion microscope objective according to claim 6, wherein the correction ring and/or the barrel are provided with coverslip marks.

8. The immersion microscope objective according to claim 3, wherein the surface of the lens (L1) facing the object plane is plane.

9. The immersion microscope objective according to claim 3, wherein a correction ring for varying the distances ($A_1$), . . . , ($A_6$) is provided at the barrel (2) of the objective as solution adjusting means.

10. The immersion microscope objective according to claim 9, wherein the correction ring and the barrel are provided with solution marks.

11. The immersion microscope objective according to claim 3, wherein the correction ring is provided as temperature adjusting means.

12. The immersion microscope objective according to claim 11, wherein the correction ring and/or the barrel are provided with temperature marks.

13. The immersion microscope objective according to claim 3, having the following constructional data with radii r and thicknesses d in mm, refractive indices $n_e$ and Abbe numbers $V_e$ at a wavelength of 546.07 nm:

|    | r       | d     | a | ne    | ve   |
|----|---------|-------|---|-------|------|
| L1 | plan    | 0.640 |   | 1.489 | 70.2 |
|    | −0.6680 |       |   |       |      |

-continued

|  | r | d | a | ne | νe |
|---|---|---|---|---|---|
| L2 |  | 2.905 |  | 1.888 | 40.5 |
|  | −2.6970 |  | $A_1$ |  |  |
|  | −118.8466 |  |  |  |  |
| L3 |  | 5.700 |  | 1.440 | 94.6 |
|  | −7.6060 |  | $A_2$ |  |  |
|  | 20.5350 |  |  |  |  |
| L4 |  | 7.100 |  | 1.530 | 76.6 |
|  | −8.7856 |  |  |  |  |
| L5 |  | 1.100 |  | 1.617 | 44.3 |
|  | 20.3850 |  |  |  |  |
| L6 |  | 4.800 |  | 1.530 | 76.6 |
|  | −17.2770 |  | $A_3$ |  |  |
|  | 14.9616 |  |  |  |  |
| L7 |  | 1.100 |  | 1.755 | 35.1 |
|  | 8.0590 |  |  |  |  |
| L8 |  | 6.700 |  | 1.440 | 94.6 |

-continued

|  | r | d | a | ne | νe |
|---|---|---|---|---|---|
|  | −10.9030 |  |  |  |  |
| L9 |  | 1.100 |  | 1.641 | 42.2 |
|  | plane |  | $A_4$ |  |  |
|  | 8.9130 |  |  |  |  |
| L10 |  | 3.000 |  | 1.652 | 33.6 |
|  | 20.0960 |  | $A_5$ |  |  |
|  | −25.8510 |  |  |  |  |
| L11 |  | 2.000 |  | 1.652 | 33.6 |
|  | −9.5760 |  |  |  |  |
| L12 |  | 1.100 |  | 1.489 | 70.2 |
|  | 5.3088 |  | $A_6$ |  |  |
|  | plane. |  |  |  |  |

* * * * *